United States Patent [19]

Goedde et al.

[11] 4,203,887
[45] May 20, 1980

[54] MODIFIED POLYESTER COMPOSITION

[75] Inventors: Edwin J. Goedde, Mt. Vernon, Ind.; Fred F. Holub, Schenectady, N.Y.; Phillip S. Wilson, Mt. Vernon, Ind.

[73] Assignee: General Electric Company, Pittsfield, Mass.

[21] Appl. No.: 870,679

[22] Filed: Jan. 19, 1978

[51] Int. Cl.$^2$ .................. C08K 3/36; C08K 7/14; C08K 9/06; C08L 67/02
[52] U.S. Cl. ................................ 260/40 R
[58] Field of Search .................... 260/860, 40 R

[56] References Cited

U.S. PATENT DOCUMENTS

| | | | |
|---|---|---|---|
| 3,290,165 | 12/1966 | Iannicelli | 260/40 R |
| 3,764,576 | 10/1973 | Russo | 260/40 R |
| 3,907,926 | 9/1975 | Brown et al. | 260/860 |
| 3,953,394 | 4/1976 | Fox et al. | 260/40 R |
| 4,018,738 | 4/1977 | Rawlings | 260/40 R |
| 4,024,102 | 5/1977 | Stockman et al. | 260/860 X |
| 4,044,073 | 8/1977 | Baron et al. | 260/860 |
| 4,064,098 | 12/1977 | Saitoh et al. | 260/40 R |
| 4,113,692 | 9/1978 | Wambach | 260/860 |

*Primary Examiner*—Sandra M. Person
*Attorney, Agent, or Firm*—Morgan, Finnegan, Pine, Foley & Lee

[57] ABSTRACT

Modified thermoplastic polyester compositions are provided which comprise (a) a poly(1,4-butylene terephthalate) resin and, optionally, a poly(ethylene terephthalate) resin and (b) a modifier therefor comprising (i) a silane-treated clay; (ii) acicular calcium metasilicate, (iii) a combination of segmented copolyester and an aromatic polycarbonate; or (iv) novaculite or a combination thereof. The modifiers provide easier processability and enhanced resistance to warpage in articles molded from the compositions.

17 Claims, No Drawings

MODIFIED POLYESTER COMPOSITION

This invention relates to modified thermoplastic polyester compositions which are more readily moldable to articles of improved dimensional stability. More particularly, the invention pertains to compositions of a poly(1,4-butylene terephthalate) resin and, optionally, a poly(ethylene terephthalate) resin which are modified with an effective amount of a mineral filler or a resinous combination.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly (ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

Stable polyblends of poly(1,4-butylene terephthalate) and poly(ethylene terephthalate) can be unreinforced and reinforced and molded into useful articles. See Fox and Wambach, U.S. Pat. No. 3,953,394, incorporated herein by reference. It has now been discovered that such polyesters and polyblends can be greatly improved in processability and dimensional stability by intimately admixing therewith a select family of modifiers.

DESCRIPTION OF THE INVENTION

According to one aspect of this invention, there are provided thermoplastic compositions which are useful for molding, e.g., injection molding, compression molding, transfer molding, and the like, the compositions comprising:
 (a) a polyester composition comprising, in intimate admixture, a poly(1,4-butylene terephthalate) resin and a poly(ethylene terephthalate) resin and
 (b) an amount of up to 60 parts per 100 parts by weight of (a) and (b) of a modifier therefor comprising:
  (i) a silane-treated clay;
  (ii) acicular calcium metasilicate
  (iii) a combination of a segmented copolyester and an aromatic polycarbonate; or
  (iv) novaculite, or a mixture thereof.

According to a second aspect of this invention, there are provided thermoplastic compositions comprising
 (a) a poly(1,4-butylene terephthalate) and
 (b) a modifier therefor comprising in combination
  (v) an aminosilane-treated clay; and
  (vi) a segmented copolyester.

The polyester resins of the compositions of this invention are available commercially or can be prepared by known techniques such as by the alcoholysis of esters of terephthalic acid with ethylene glycol or butane diol and subsequent polymerization, by heating the glycols with the free acids or with halide derivatives thereof, and similar processes. These are described in U.S. Pat. Nos. 2,465,319 and 3,047,539, and elsewhere.

Illustratively, these high molecular weight polyesters will have an intrinsic viscosity of at least about 0.4 deciliters/gram and preferably, at least 0.6 deciliters/gram as measured in a 60:40 phenol/tetrachloroethane mixture at 30° C.

Especially useful when high melt strength is important are branched high melt viscosity poly(1,4-butylene terephthalate) resins, which include a small amount, e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or, preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyteraphthalate, and the like.

The branched poly(1,4-butylene terephthalate) resins and their preparation are described in Borman, U.S. Pat. No. 3,953,404, incorporated herein by reference.

In certain preferred features the composition will include reinforcing fibrous (filamentous) glass. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 and 0.250 inch.

The amount of the reinforcing glass can vary widely depending on the formulation and needs of the particular composition, it being essential only that an amount is selected which is at least sufficient to provide reinforcement. Preferably, however, the reinforcing fibrous glass will comprise from about 1 to about 60% by weight of fibrous glass and (a) and (b), combined.

It has also been discovered that the polyester compositions of this invention which contain modifiers and inorganic fillers e.g., talc, clays and the like, and fibrous glass exhibit improved impact and flexural properties when the glass is predispersed in the resin.

It has further been found that even relatively minor amounts of the modifier (b) are effective in providing significant improvements in processability, etc. In general, however, the modifier (b) will be present in amounts of at least about 1% by weight, preferably from about 2.5 to about 50% by weight of (a) and (b). With amounts in excess of 50% by weight, some reduction in ease of processability may be experienced.

Modifier (b) (i), a silane-treated clay can be made by treating finely divided reinforcing clay, e.g., kaolin clay, i.e., hydrophylic hydrous aluminum silicate, with a silane, e.g., vinyl tris-2-methoxy ethoxy silane to produce a silane-treated, readily dispersible clay. A preferred silane treated clay is made by reacting kaolin with γ-aminopropyl ethoxysilane, to produce an aminosilane-treated clay.

Modifier (b) (ii), acicular calcium metasilicate is known as wollastonite, and has become commercially available as a filler for polyester, melamine, epoxy, urethane, nylon and vinyl resins. The effectiveness can be enhanced by the use of silanes, as mentioned above for clay.

Modifier (b) (iii) comprises a combination of a segmented block copolyester, e.g., a block polybutylene-co-polypropylene glycol terephthalate resin in combination with an aromatic polycarbonate, e.g., a bisphenol-A-phosgene resinous reaction product. These can be made in known ways, and they are commercially available, e.g., the former as Hytrel 4055 from DuPont Company, Wilmington, Del., U.S.A., and the latter as Lexan ® from General Electric Co., Pittsfield, Mass., U.S.A. The relative ratios of components in modifier (b) (iii) can vary broadly, e.g., from 1 to 99 parts of the first to 99 to 1 parts of the second, but in general, from 60 to 40 parts of the segmented copolyester will be present for each 40 to 60 parts of the aromatic polycarbonate per 100 parts by weight by (b) (iii).

Novaculite is a well known commercial crystalline microform of silica. Its use to fill polyesters is described in Segal, U.S. Pat. No. 3,740,371, and in Rawlings U.S. Pat. No. 4,018,738, each of which is incorporated herein by reference. A preferred commercially available form of novaculite is a treated type designated Novakup 174-.05, by its supplier Malvern Minerals Co., of Hot Springs, Ark., U.S.A.

Other ingredients, such as dyes, pigments, flame retardants, drip retardants, and the like can be added for their conventionally employed purposes.

The compositions of this invention can be prepared by a number of procedures. In one way, the modifier and any reinforcement, e.g., glass fibers is put into an extrusion compounder with the resinous components to produce molding pellets. The modifier, and reinforcement, if any, is dispersed in a matrix of the resin in the process. In another procedure, the modifier is mixed with the resins by dry blending, then either fluxed on a mill and comminuted, or they are extruded and chopped. The modifying agent can also be mixed with the resins and directly molded, e.g., by injection or transfer molding techniques.

It is always important to thoroughly free all of the ingredients; resin, modifier, reinforcement, if used, and any optional, conventional additives from as much water as possible.

In addition, compounding should be carried out to ensure that the residence time in the machine is short; the temperature is carefully controlled; the friction heat is utilized; and an intimate blend between the resin and the modifier is obtained.

Although it is not essential, best results are obtained if the ingredients are pre-compounded, pelletized and then molded. Pre-compounding can be carried out in conventional equipment. For example, after carefully pre-drying the polyester and modifier and the reinforcing agent, if used, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 450°–525° F. and conventional mold temperatures, e.g., 130°–150° F.

DESCRIPTION OF THE PREFERRED EMBODIMENTS

The following examples illustrate the invention. They are set forth as a further description but are not to be construed as limiting the invention thereto.

EXAMPLES 1–4

Dry blends of poly(1,4-butylene terephthalate) resin (PBT), intrinsic viscosity 1.05 dl/g., melt viscosity 6,200 poise, poly(ethylene terephthalate) (PET), intrinsic viscosity 0.62 dl/g., and silane-treated clay and mold release/stabilizer are compounded and extruded at 520° F. in an extruder. The extrudate is pelletized and injection molded at 520° F. (mold temperature 130° F.). The formulations and physical properties are shown in Table 1.

Table 1.

| | Compositions Comprising Polyesters And Silane-Treated Clay | | | | |
|---|---|---|---|---|---|
| Example | 1A* | 1 | 2 | 3 | 4 |
| Composition (parts by wt.) | | | | | |
| Poly(1,4-butylene terephthalate) | 60 | 54 | 48 | 42 | 36 |
| Poly(ethylene terephthalate) | 40 | 36 | 32 | 28 | 24 |
| Silane-treated clay | — | 10 | 20 | 30 | 40 |
| Properties | | | | | |
| Warpage, room temperature, mm. | <1 | <1 | <1 | <1 | <1 |
| Warpage after 30 min. at 350° F., mm. | >20 | 7 | 2 | 1 | 1 |
| Unnotched Izod impact strength, ft.-lbs./in. | 11.3 | 7.8 | 14.5 | 9.5 | 6.9 |
| Notched Izod impact strength, ft.-lbs./in. notch | 0.5 | 0.4 | 0.4 | 0.3 | 0.3 |

*Control

Some difficulty in molding was found at 50 phr (parts per hundred resin) of silane-treated clay. In all of the examples the processability was excellent and the molded articles were very much improved in dimensional stability.

EXAMPLES 5-9

The general procedure of Examples 1-4 is employed to make compositions of poly(1,4-butylene terephthalate), poly(ethylene terephthalate) and acicular calcium metasilicate. The formulations used and the properties obtained are set forth in Table 2:

Table 2.

| | Compositions Comprising Polyesters And Acicular Calcium Metasilicate | | | | | |
|---|---|---|---|---|---|---|
| Examples | 5A* | 5 | 6 | 7 | 8 | 9 |
| Composition (parts by wt.) | | | | | | |
| Poly(1,4-butylene terephthalate) | 60 | 54 | 48 | 42 | 36 | 30 |
| Poly(ethylene terephthalate) | 40 | 36 | 32 | 28 | 24 | 20 |
| Acicular calcium metasilicate | — | 10 | 20 | 30 | 40 | 50 |
| Properties | | | | | | |
| Heat distort. temp. at 264 psi, °F. | 165 | 185 | 189 | 192 | 212 | 259 |
| Warpage at R.T., mm. | <1 | <1 | <1 | <1 | <1 | <1 |
| Warpage at 350° F., 30 min., mm. | >20 | 3 | 5 | 14 | 13 | 12 |
| Notched Izod impact, ft.-lbs./in.notch | 0.5 | 0.5 | 0.5 | 0.6 | 0.7 | 0.7 |
| Unnotched Izod impact, ft.-lbs./in. | 11.3 | 4.0 | 5.9 | 7.3 | 6.9 | 4.9 |

*Control

All of the compositions of Examples 5-9 molded very easily in comparison to the control. Examples 5 and 6, especially, were relatively warp-free and easy to process.

EXAMPLES 10-12

The general procedure of Examples 1-4 is used to make fibrous glass reinforced compositions of poly(1,4-butylene terephthalate), poly(ethylene terephthalate) and a modifier combination of a segmented copolyester and an aromatic polycarbonate. The formulations used and the properties obtained are set forth in Table 3:

Table 3.

| | Reinforced Compositions Comprising Polyesters, A Segmented Copolyester And An Aromatic Polycarbonate | | |
|---|---|---|---|
| Example | 10 | 11 | 12 |
| Composition (parts by wt.) | | | |
| Poly(1,4-butylene terephthalate) | 42.5 | 40 | 40 |
| Poly(ethylene terephthalate) | 30.0 | 30 | 30 |
| Talc | 15.0 | 15 | 15 |
| Glass reinforcement | 10.0 | 10 | 10 |
| Blend-60 segmented copolyester and 40 aromatic polycarbonate | 2.5 | 2 | — |
| Blend-50 segmented copolyester and 50 aromatic polycarbonate | — | — | 5 |
| Properties | | | |
| Heat distortion temp. 264 psi, °F. | 361 | — | 358 |
| Warp at R.T., mm. | <1 | <1 | <1 |
| Warp after 30 min/ 350° F., mm. | 9 | 10 | 8 |
| Notched Izod impact, ft. lbs./in. notch | 1.0 | 1.0 | 0.9 |
| Unnotched Izod impact ft.-lbs./in. | 8.3 | 8.7 | 8.5 |

The compositions are very efficiently modified, especially in terms of impact strength, with the segmented copolyester—aromatic polycarbonate blends.

EXAMPLES 13-17

The general procedure of Examples 1-4 is used to make compositions of poly(1,4-butylene terephthalate), poly(ethylene terephthalate) and novaculite. The formulations used and the properties obtained are set forth in Table 4.

Table 4.

| | Compositions Comprising Polyesters And Novaculite | | | | | |
|---|---|---|---|---|---|---|
| Example | 13A* | 13 | 14 | 15 | 16 | 17 |
| Composition (parts by wt.) | | | | | | |
| Poly(1,4-butylene terephthalate) | 60 | 54 | 48 | 42 | 36 | 30 |
| Poly(ethylene terephthalate) | 40 | 36 | 32 | 28 | 24 | 20 |
| Novaculite | 0 | 10 | 20 | 30 | 40 | 50 |
| Properties | | | | | | |
| Warpage at R.T., mm. | <1 | <1 | <1 | <1 | <1 | <1 |
| Warpage after 30 min. at 350° F., mm. | >20 | 15 | 5 | 4 | <1 | <1 |
| Heat distortion temp. at 264 psi, °F. | 165 | 169 | 167 | 172 | 194 | — |
| Unnotched Izod impact, ft.lbs./in. | 11.3 | 11.1 | 8.2 | N.B.** | 15.5 | 12.2 |
| Notched Izod impact, ft.lbs./in. notch | 0.5 | 0.5 | 0.5 | 0.5 | 0.5 | 0.5 |

*Control
**Did not break

All compositions of Examples 13-17 were easily molded. Especially at 30 and 40 parts of novaculite, low warpage and good unnotched Izod impact strength were seen.

EXAMPLES 18-25

The general procedure of Examples 1-4 is used to make compositions of poly(1,4-butylene terephthalate), aminosilane treated clay and a segmented copolyester. The formulations used and the properties obtained are set forth in Table 5:

Table 5.

| | Compositions Comprising Polyester Glass Fibers, Aminosilane-treated Clay and Segmented Copolyester | | | |
|---|---|---|---|---|
| Example | 18 | 19 | 20 | 21 |
| Composition (parts by wt.) | | | | |
| Poly(1,4-butylene terephthalate) | 58 | 48 | 30 | 28 |
| 30% Fibrous glass-filled poly(1,4-butylene terephthalate) | 20 | 30 | 40 | 50 |
| γ-aminopropylsilane-treated clay | 14 | 14 | 14 | 14 |
| Segmented copolyester | 7 | 7 | 7 | 7 |

Table 5.-continued

| | Compositions Comprising Polyester Glass Fibers, Aminosilane-treated Clay and Segmented Copolyester | | | |
|---|---|---|---|---|
| Fibrous glass | — | — | — | — |
| Properties | | | | |
| Heat distortion temp. at 264 psi, °F. | 318 | 300 | 340 | 350 |
| Warp at R.T., mm. | <1 | <1 | <1 | <1 |
| Warp at 30 min. 350° F., mm. | 4 | 6 | 12 | 19 |
| Notched Izod impact, ft.lbs./in. notch | 1.3 | 1.4 | 1.4 | 1.7 |
| Unnotched Izod impact, ft.lbs./in. | 13.8 | 12.2 | 12.1 | 11.4 |
| Flexural str., psi | 14,700 | 16,700 | 17,500 | 19,000 |
| Flexural mod., psi | 491,000 | 609,000 | 604,000 | 716,000 |
| Example | 22 | 23 | 24 | 25 |
| Composition (parts by wt.) | | | | |
| Poly(1,4-butylene terephthalate) | 73 | 70 | 67 | 64 |
| 30% Fibrous glass filled poly(1,4-butylene terephthalate) | — | — | — | — |
| γ-aminopropylsilane-treated clay | 14 | 14 | 14 | 14 |
| Segmented copolyester | 7 | 7 | 7 | 7 |
| Fibrous glass | 6 | 9 | 12 | 15 |
| Properties | | | | |
| Heat distortion temp. at 264 psi., °F., | 284 | 348 | 354 | 363 |
| Warp at R.T., mm. | 1 | 6 | 6 | 13 |
| Warp at 30 min. 350° F., mm | 8 | 14 | 17 | 18 |
| Notched Izod impact, ft. lbs./in. notch | 1.2 | 1.3 | 1.3 | 1.2 |
| Unnotched Izod impact, ft.lbs./in. | 12.3 | 9.6 | 9.3 | 9.1 |
| Flexural strength, psi. | 13,500 | 15,500 | 16,700 | 17,500 |

The compositions have low warp after molding and expecially excellent impact strength. It can also be noted that precompounding the glass fibers into the polyester resin prior to blending (Examples 18–21) with the remaining ingredients leads to lower warpage and improved impact and flexural strengths.

Obviously, other modifications and variations of the present invention are possible in the light of the above teachings. It is therefore, to be understood that changes may be made in the particular embodiments described above which are within the scope of the invention as defined in the appended claims.

We claim:
1. A thermoplastic composition comprising:
   (a) a polyester composition comprising, in intimate admixture, a poly(1,4-butylene terephthalate) resin and a poly(ethylene terephthalate) resin and
   (b) an amount of up to 60 parts per 100 parts by weight of (a) and (b) of a modifier therefor comprising:
      (i) a silane-treated clay;
      (ii) acicular calcium metasilicate;
      (iii) a combination of a segmented copolyester and an aromatic polycarbonate; or
      (iv) novaculite, or a mixture thereof, said composition being more readily moldable to articles having improved dimensional stability in comparison with the corresponding compositions wherein the modifer is not present.
2. A composition as defined in claim 1 wherein the modifier (b) is present in an amount of at least about 1.0% by weight of (a) and (b).
3. A composition as defined in claim 1 wherein the modifier (b) is present in an amount of from about 2.5 to about 50% by weight of (a) and (b).
4. A composition as defined in claim 1 which also includes reinforcing fibrous glass in an amount of from about 1 to about 60% by weight of (a), (b) and said fibrous glass.
5. A thermoplastic composition as defined in claim 4 wherein component (a) comprises fibrous glass pre-dispersed in said intimate admixture of a poly(1,4-butylene terephthalate) and a poly(ethylene terephthalate).
6. A composition as defined in claim 1 wherein said polyester resins (a) have an intrinsic viscosity of at least about 0.4 deciliters/grams when measured in a solution in a 60:40 mixture of phenol and trichloroethane at 30° C.
7. A composition as defined in claim 6 wherein said polyesters have an intrinsic viscosity of at least about 0.6 deciliters per gram when measured in a solution in a 60:40 mixture of phenol and trichloroethane at 30° C.
8. A composition as defined in claim 1 wherein said poly(1,4-butylene terephthalate) resin is linear or branched.
9. A composition as defined in claim 8 wherein said branched polyester is a high melt viscosity (1,4-butylene terephthalate) resin which includes a small amount of a branching component containing at least three ester forming groups.
10. A composition as defined in claim 1 wherein said modifier (b) is a silane-treated clay.
11. A composition as defined in claim 10 wherein said modifier (b) is an aminosilane-treated clay.
12. A composition as defined in claim 1 wherein said modifier (b) is acicular calcium metasilicate.
13. A composition as defined in claim 1 wherein said modifier (b) is a combination of a segmented copolyester and an aromatic polycarbonate.
14. A composition as defined in claim 1 wherein said modifier (b) is novaculite.
15. A thermoplastic composition comprising:
   (a) a poly(1,4-butylene terephthalate) and
   (b) a modifier therefor comprising in combination
      (v) an aminosilane-treated clay; and
      (vi) a segmented copolyester, said compositions being more readily moldable to articles having improved dimensional stability in comparison with the corresponding compositions wherein the modifier is not present.
16. A thermoplastic composition as defined in claim 15 which also includes reinforcing fibrous glass in an amount of from about 1 to about 60% by weight of (a), (b) and said fibrous glass.
17. A thermoplastic composition as defined in claim 16 wherein component (a) comprises fibrous glass pre-dispersed in said poly(1,4-butylene terephthalate).

* * * * *

UNITED STATES PATENT AND TRADEMARK OFFICE
CERTIFICATE OF CORRECTION

PATENT NO. : 4,203,887
DATED : May 20, 1980
INVENTOR(S) : Edwin Joseph Goedde et al It is certified that error appears in the above-identified patent and that said Letters Patent are hereby corrected as shown below:

In the Title, "Composition" should read -- Compositions --.

In Col. 2, line 26, "hydroxyteraphthalate" should read -- hydroxyterephthalate --;

In Col. 5, line 60, in Table 3, under Example 11, "2" should read -- 5 --.

In Col. 7, line 12, under Example 20, "1.4 1.7" should read -- 1.4 -- and under Example 21, insert -- 1.7 --.

Signed and Sealed this

Ninth Day of December 1980

[SEAL]

Attest:

SIDNEY A. DIAMOND

Attesting Officer

Commissioner of Patents and Trademarks